United States Patent [19]

Walker

[11] Patent Number: 5,360,618
[45] Date of Patent: Nov. 1, 1994

[54] FLAVORING SYSTEM

[75] Inventor: Sherri A. Walker, Alexandria, Ohio

[73] Assignee: Abbott Laboratories, Abbott Park, Ill.

[21] Appl. No.: 233,201

[22] Filed: Apr. 26, 1994

Related U.S. Application Data

[63] Continuation of Ser. No. 985,373, Dec. 4, 1992, abandoned.

[51] Int. Cl.$^5$ .............................................. A23L 1/30
[52] U.S. Cl. ...................................... 426/72; 426/73; 426/74; 426/548; 426/650; 426/651; 426/656; 426/657
[58] Field of Search ..................... 426/72, 73, 74, 548, 426/549, 650, 651, 656, 657

[56] References Cited

U.S. PATENT DOCUMENTS

| | | | |
|---|---|---|---|
| 4,311,720 | 1/1982 | Marmo et al. | 426/651 X |
| 4,900,566 | 2/1990 | Howard | 426/72 |

FOREIGN PATENT DOCUMENTS 4-158744 of 1992 Japan.
92/02149 of 1992 WIPO.

OTHER PUBLICATIONS

Sale Literature and Technical Information regarding Sylox ® Silicas published in 1992 by Davisson Chemical Div., W. R. Grace & Co.

"The Oxidative Stability and Retention of a Limonene-Based Mode Flavor Plated on Armophous Silica and Other Selected Carriers", Bolton et al., *Perfumer & Flavorist*, vol. 17, Mar./Apr. 1992, pp. 2–20.

*Primary Examiner*—Joseph Golian
*Attorney, Agent, or Firm*—Lonnie R. Drayer; Donald O. Nickey

[57] ABSTRACT

An improved method of preserving the flavor in a food product, such as a low calorie food bar, is characterized by stabilizing the flavoring by plating the flavoring on synthetic amorphous silica. An improved flavoring system for a food product contains aspertame and/or proteinaceous material in combination with a flavoring plated on synthetic amorphous silica.

8 Claims, No Drawings

FLAVORING SYSTEM

This is a continuation of application Ser. No. 07/985,373 filed Dec. 4, 1992 and now abandoned.

TECHNICAL FIELD

The present invention relates generally to a flavoring system, and more particularly to a flavoring system for use in a low carbohydrate, high-protein, nutrient-dense food bar.

BACKGROUND ART

Numerous studies that have evaluated effects of excessive body weight on mortality suggest that mortality increases with increasing weight. The mortality ratio (the actual number of deaths as a percent of expected deaths for a population) increases with degree and duration of obesity from 110 among persons 5 to 15 percent overweight to 227 among those 55 to 65 percent overweight. Morbid obesity (100 percent over desirable weight) has been associated with a mortality ratio of 1200.

Relative body weights above 100 to 109 percent of desirable weight are associated with increased incidence of morbidity from cardiovascular diseases, cancer, diabetes, and digestive diseases. The greater the relative weight, the greater the risk for these conditions. Many other potentially serious conditions such as sleep apnea, gallbladder disease, osteoarthritis, and other bone and joint disorders are associated with obesity. In the United States alone, studies have shown that over 34,000,000 individuals could be classified as being overweight.

Weight loss and subsequent weight maintenance reduce the health risks associated with obesity. A variety of approaches including reducing caloric intake, exercise, behavior modification, drug therapy, surgery, and combinations of these methods are currently practiced. Some approaches are more "aggressive" than others.

An "aggressive" approach to weight management is not new. Prolonged total fasting under hospital supervision became an accepted approach for treating morbid obesity in the early 1960's. Total fasting (starvation) is characterized physiologically by decreases in serum insulin and glucose concentrations and increases in serum free fatty acids (from body fat) and ketone concentrations (substrate from body fat).

Additionally, total fasting results in the excretion of higher than normal concentrations of potassium (with related electrolyte imbalances) and loss of lean body mass (i.e., nitrogen—protein—losses from skeletal muscle and organ tissue). The increase in serum ketones occurring during fasting is important in decreasing body protein losses as the ketones substitute for protein-derived glucose. Although body protein losses are reduced, they remain significant and seriously detrimental. While weight loss and rate of weight loss was significant with total fasting regimens, health- and life-threatening physiologic complications such as significant loss of lean body mass, electrolyte imbalances, and nutrient deficiencies associated with this treatment limited their use.

Information obtained from early experiences with total fasting led to the development of safer and more effective dietary regimens such as the protein-sparing diet of the very-low-calorie type, (PSD/VLC), also referred to as a protein-sparing modified fast. Currently, this relatively "aggressive" approach to weight loss and management is considered an accepted treatment for obesity when used as part of a medically supervised, comprehensive program.

The goal of a PSD/VLC diet is to achieve weight loss of body fat comparable to that of fasting, while sparing lean body mass and avoiding electrolyte imbalances and nutrient deficiencies. The administration of exogenous protein (i.e., from diet) of high quality promotes improved body protein-sparing over fasting alone. Studies suggest that providing a level of protein of 1.2 to 1.5 g/kg body weight facilitates protein-sparing, thus making the PSD/VLC diet a safer regimen. PSD/VLC regimens, therefore, must contain relatively high levels of protein and very low levels of carbohydrate when compared with a "typical" diet to be safe and efficacious.

The recommended percent distribution of total calories provided by protein, fat, and carbohydrate for a "typical" diet is 15 to 20%, less than 30%, and 50 to 55%, respectively. In a "typical" diet providing as few as 800 calories (a number representative of a very-low-calorie diet), 50 to 55% of the calories as carbohydrate is approximately 100 to 110 grams. The maximum amount of carbohydrate per day that will facilitate ketone production is 50 grams. Therefore, low levels of carbohydrate (less than 50 grams per day) and high levels of protein are essential to the effectiveness of a PSD/VLC diet as they facilitate body fat utilization for energy (ketosis and free fatty acid production) and spare body protein.

PSD/VLC type diets must also provide vitamins and minerals, especially electrolytes, at levels that meet an individual's needs for maintaining nutritional status, as well as the increased needs resulting from the physiologic response to the fasting regimen. Ideally, all nutrients needed for nutritional safety should be contained in the meal replacement product to reduce the need for vitamin/mineral/electrolyte supplementation and the inherent risk of non-compliance with supplementation regimens.

Typically, individuals who respond favorably to a PSD/VLC diet may be kept on the regimen until their goal weight is obtained. Therefore, they may be on the regimen for months, usually more than 3 months and sometimes over a year. While most PSD/VLC beverages are well-tolerated, individuals often complain that they miss the action and associated sensations of chewing food while on the diet regimen. Currently, no solid food form is available that meets accepted formulation criteria for such a regimen. There is provided by the present invention a solid food form (bar) that may replace a serving of the beverage due to its similar nutritional profile. The development of a bar acceptable from organoleptic and textural properties was a challenge due to the unique nutritional profile of a bar required to accommodate the physiologic response to the PSD/VLC regimen and to make this product safe for use with such a diet regimen.

In any attempt to produce a meal replacement bar for use in conjunction with a PSD/VLC diet, it is necessary to overcome a number of inter-related problems. First, the bar must be of a palatable texture. This problem is particularly acute in attempting to design a low carbohydrate, high protein, nutrient-dense, solid food product since the high concentration of protein tends to facilitate tight bonding, such that the food product becomes rubbery or brick-like in as little as a few days.

Thus, prior attempts have had problems creating a solid food product which had a reasonable shelf life with respect to a palatable texture.

The second problem, and one which has applications far beyond the creation of a high protein solid food product, is the inherent problem of flavor system having stability in high protein, low carbohydrate solid products. There are two sources to this problem, and the fact that these two sources are interrelated exacerbates the problem. The first source is the fact that carbohydrates and, to a far greater degree, proteins are known to bind flavors. Furthermore, the high level of protein present in PSD/VLC foods increases any tendency for the protein to react with the flavoring components. This problem is compounded further by the need to compensate for undesirable flavors introduced by vitamins and minerals in concentrations required by this dietary regimen.

The second source of the problem is the desired presence of the sweetener, aspartame. Aspartame is well known for reacting with flavors. The problem caused by the high level of proteins and the presence of aspartame in a PSD/VLC food product normally culminates in one of two results. The first is a food product which over time experiences a change in flavor, such that the taste becomes one which is totally undesirable. The other possible result is for the reaction of the protein and aspartame with the flavor component to cause a significant loss in flavor over a relatively short period of time. Additionally, it is extremely difficult to predict how various proteins, aspartame and flavoring components will react in a given food product.

Although problems related to the obtaining of a palatable texture and a stable flavor are the primary concerns in manufacturing such a food product, it also must be kept in mind that problems can exist in the initial selection of a flavoring component. Regardless of the theoretical stability of flavoring, any given flavor may initially react differently with a food product composition. Therefore, just because a flavoring component has been successfully used before or in conjunction with a certain food product formulation is no guarantee that the flavor will respond similarly with a different list of ingredients. There is a fair amount of prior art related to the solving of this or a similar problem. Perhaps the most pertinent are U.S. Pat. No. 4,900,566 for a confectionery product and process for producing the same; Patent WO 92/02149 for a reduced-calorie low-moisture absorbing bulking agent compositions and methods for preparing same; and Japanese Patent No. Hei 4-158744-A for a low-calorie chocolate preparation.

The U.S. Patent concerns a process and confectionery product wherein the proteinaceous material and carbohydrate material are present in a relative ratio of from about 1:1 to 1:10. In addition, the sweetening agents do not include aspartame. The patent on bulking agent compositions pertains to products which can be incorporated into chewing gum or confections similar to nougat. The Japanese patent pertains to a low-calorie chocolate preparation involving dough, however no mention is made of protein content, suitability of use in a PSD/VLC, or manufacture in food bar form.

It is thus apparent that a need exists for a solid food product such as a food bar, which provides a high level of protein, a low level of carbohydrates and is nutrient-dense and does so having both a palatable texture and a stable flavor delivery system.

It is apparent that a need exists for a flavor system which has good shelf life when used in conjunction with aspartame and/or high levels of protein.

DISCLOSURE OF THE INVENTION

There is disclosed a low carbohydrate, high protein, nutrient-dense food bar comprising proteinaceous material, flavoring, aspartame, and carbohydrate material, with the concentration of proteinaceous material being greater than the concentration of carbohydrate material and more specifically greater than the concentration of available carbohydrate material. Preferably the food bar includes a plurality of vitamins and minerals, with the concentration of the vitamins and minerals comprising at least 4.5% of the food bar by weight.

The concentration of proteinaceous material is preferably at least 37% of the food bar by weight, and represents high quality protein. The terminology "high quality protein" refers to protein which has a protein efficiency ratio of 2.5 or higher. Additionally the concentration of available carbohydrate material preferably comprises at most 25% of the food bar by weight. Still further, the food bar comprises fat with the concentration of fat comprising at least 9% of the food bar by weight. More preferably the concentration of proteinaceous material comprises between 37% and 43% of the food bar by weight, the concentration of available carbohydrate material comprises about 25% of the food bar by weight, and the concentration of fat comprises between 9% and 10.7% of said food bar by weight. Additionally, the energy value associated with a food bar weighing 67 g. is about 210 Kcals. Also the food bar includes synthetic amorphous silica.

There is also disclosed a low calorie food bar comprising proteinaceous material, flavoring, a plurality of vitamins and minerals, synthetic amorphous silica, aspartame, and carbohydrate material, with the concentration of proteinaceous material being greater than the concentration of carbohydrate material. Preferably the concentration of the vitamins and minerals comprises at least 4.5% of the food bar by weight. Also the concentration of proteinaceous material comprises between 37% and 43% of the food bar by weight, and the concentration of available carbohydrate material comprises about 25% of the food bar by weight. Preferably the food bar contains fat, and the concentration of fat comprises between 9% and 10.7% of said food bar by weight.

There is also disclosed a low calorie food bar comprising proteinaceous material, flavoring, a plurality of vitamins and minerals, fat, synthetic amorphous silica, aspartame, and carbohydrate material, with the concentration of proteinaceous material being greater than the concentration of carbohydrate material, the proteinaceous material comprises between 37% and 43% of the food bar by weight, the concentration of available carbohydrate material comprises about 25% of the food bar by weight, and the concentration of fat comprises between 9% and 10.7% of said food bar by weight. Preferably the concentration of vitamins and minerals comprises at least 4.5% of the food bar by weight. Also the energy value associated with the food bar is about 210 Kcals.

There is also disclosed an improved method for preserving the flavor in a food product, with the method comprising the following steps: 1) providing the following ingredients for said food product: proteinaceous material, flavoring, aspartame, and carbohydrate material; 2) mixing the ingredients; and 3) forming the mixture from step (2) into the food product, the improvement characterized by stabilizing the flavoring in a food product comprising the above ingredients by plating said flavoring on synthetic amorphous silica.

The method has the flavoring plated on synthetic amorphous silica, the plated silica being added in an oil phase. The plated silica is preferably added to a mixture of proteinaceous material, aspartame, and carbohydrate material. The method has the aspartame added to a mixture of proteinaceous material and carbohydrate material. The ingredients also preferably comprise fat, vitamins, and minerals.

There is also disclosed an improved method for preserving the flavor in a food product, with the method comprising the following steps: 1) providing the following ingredients for the food product: proteinaceous material, fat, flavoring, aspartame, and carbohydrate material; 2) mixing the ingredients; and 3) forming the mixture from step (2) into the food product, the improvement characterized by stabilizing the flavoring in a food product comprising the above ingredients by plating the flavoring on synthetic amorphous silica, with said plated silica being added in an oil phase to a mixture of proteinaceous material, aspartame, and carbohydrate material. The ingredients also preferably comprise vitamins and minerals.

There is also disclosed an improved method for preserving the flavor in a food bar, with the method comprising the following steps: 1) providing the following ingredients for the food bar: proteinaceous material, flavoring, aspartame, and carbohydrate material, with the concentration of proteinaceous material being greater than the concentration of carbohydrate material; 2) mixing said ingredients; and 3) forming the mixture from step (2) into a food bar, the improvement characterized by stabilizing the flavoring in a food product comprising the above ingredients by plating the flavoring on synthetic amorphous silica.

The flavoring is plated on synthetic amorphous silica, with the plated silica then being added in an oil phase. The plated silica is preferably added to a mixture of proteinaceous material, aspartame, and carbohydrate material. The aspartame is preferably added to a mixture of proteinaceous material and carbohydrate material. The ingredients also preferably comprise fat, vitamins, and minerals.

The method results in the concentration of vitamins and minerals comprising at least 4.5% of the food bar by weight. The method also results in the concentration of the proteinaceous material comprising at least 37% of the food bar by weight. More preferably the method results in the concentration of proteinaceous material comprising between 37% and 43% of the food bar by weight, the concentration of the available carbohydrate material comprising about 25% of the food bar by weight, and the concentration of fat comprising between 9% and 10.7% of the food bar by weight. Most preferably the concentration of the proteinaceous material comprises about 37% of the food bar by weight.

One aspect of the present invention provides a low calorie food bar having a pleasing texture, as well as a stable flavor which can be utilized in a very low calorie diet program.

Another aspect of the invention provides a food bar of acceptable organoleptic and textural properties that may replace a serving of the beverages associated with a PSD/VLC diet.

Still another aspect of the invention provides an improved method for preserving the flavor in a food product, especially products containing protein and/or aspartame which react with the flavoring.

Other aspects and advantages of the instant invention will be apparent from the following description, examples, and the appended claims.

DETAILED DESCRIPTION OF THE INVENTION

Specifically, the present invention is concerned with an improved method of preserving the flavor in a food product containing protein and/or aspartame which react with the flavoring; for example, a food bar which can be used in a very low calorie diet.

In a very low calorie diet, the diet itself is designed to cause the onset of ketosis. When the body is in ketosis, fat and protein (e.g. muscle) are burned far more rapidly than normal. The potential for a problem exists, since muscle mass can be lost. Therefore the dietary product attempts to minimize or obviate the potential problem by providing adequate protein levels.

Additionally, in a very low calorie diet the dieter is instructed to drink more water than normal in order to flush the body of waste. This can adversely affect the level of electrolytes. Therefore the dietary product attempts to minimize or obviate the problem by providing adequate electrolyte levels. In addition, since persons on a very low calorie diet are not supposed to be eating other foods, the dietary products themselves must provide the necessary vitamins and minerals, including trace minerals. Furthermore, with respect to some vitamins, there is the problem of degradation to consider.

Due to the protein levels associated with a food product for use in a very low calorie diet, a relatively high moisture content is required in order to produce a formable product. The relatively high moisture content creates the potential for microbial growth, so this condition needs to be addressed.

All the above considerations must be kept in mind in attempting to create a food product for use in a very low calorie diet. Additionally there are the basic food chemistry problems associated with the obtaining of a palatable texture and a stable flavor. For example, in order to obtain a palatable texture, consideration must be given to the protein source as well as to the texture stabilizers. There are a variety of protein sources which could be considered, such as soy protein, caseinates, milk protein, egg albumin and whey protein concentrate. In addition to the choice of protein source and texture stabilizers, consideration also must be given as to their relative concentrations. Also, consideration must be given as to which carbohydrates will be utilized, with choices including sorbitol, glycerin, polydextrose, fructose, maltodextrin, pectin, and gum arabic.

BEST MODE FOR CARRYING OUT THE INVENTION

For a chocolate cherry flavored food bar which accomplished the objectives associated with this invention the preferred formulation based on percent of bar weight (% weight/weight) is set forth in Table I below.

TABLE I

| Ingredient | Concentration by weight |
| --- | --- |
| Calcium caseinate | 28.74 |
| Whey protein concentrate | 14.58 |
| 90% High fructose corn syrup | 8.85 |
| Partially hydrogenated soybean oil | 7.79 |
| Glycerin | 3.70 |
| Water | 9.80 |
| Dutch process cocoa powder, lecithinated | 4.89 |
| Artificial cherry flavor | 0.20 |
| Natural chocolate flavor | 0.69 |
| Citric acid | 2.21 |
| Aspartame | 0.44 |
| Potassium sorbate | 0.19 |
| Sodium acid pyrophosphate | 0.49 |
| Sorbitol | 3.68 |
| Polydextrose | 8.85 |
| Vitamin/mineral premix | |
| Sodium phosphate dihydrate | 0.870 |
| Potassium citrate | 0.616 |
| Choline bitartrate | 0.543 |
| Magnesium hydroxide | 0.512 |
| Potassium chloride | 0.430 |
| Sodium chloride | 0.410 |
| Ascorbic acid (Vit. C) | 0.120 |
| Ferrous lactate | 0.0518 |
| dl-alpha tocopheryl acetate (Vit. E) | 0.0239 |
| Niacinamide | 0.0146 |
| Zinc oxide | 0.0102 |
| Copper gluconate | 0.0082 |
| Calcium pantothenate | 0.0080 |
| Manganese sulfate | 0.0063 |
| Thiamine mononitrate (Vit. B-1) | 0.0024 |
| Vitamin A palmitate | 0.0020 |
| Pyridoxine hydrochloride (Vit. B-6) | 0.0017 |
| Riboflavin (Vit. B-2) | 0.0013 |
| Folic acid | 0.00033 |
| Sodium molybdate | 0.00032 |
| Chromium chloride | 0.00031 |
| d-Biotin | 0.00024 |
| Sodium selenate | 0.00018 |
| Potassium iodide | 0.00008 |
| Phylloquinone (Vit. K) | 0.00005 |
| Cyanocobalamin (Vit. B-12) | 0.0000075 |
| Vitamin D3 | 0.0000069 |
| Carriers | 1.144 |

Proteinaceous material is provided by the following ingredients from Table I: calcium caseinate, whey protein concentrate, and Dutch process cocoa powder. Available carbohydrate material is provided by the following ingredients from Table I: whey protein concentrate, high fructose corn syrup, glycerin, Dutch process cocoa powder, sorbitol and polydextrose. Fat is provided by the following ingredients from Table I: partially hydrogenated soybean oil and Dutch process cocoa powder.

The cherry and chocolate flavors are plated on synthetic amorphous silica in order to minimize the reaction of the flavors with protein and aspertame in the nutritional product. The synthetic amorphous silica used in reducing the invention to practice was SYLOX-2 which is distributed by W. R. Grace, but any suitable synthetic amorphous silica may be used in practicing the invention. The artificial cherry flavor used in reducing the invention to practice was artificial cherry base oil #11931 distributed by Bush Boake Allen of Montvale, N.J. The natural chocolate flavor used in reducing the invention to practice was natural double Dutch chocolate flavor WONF #2131 distributed by Flavor Producers, Inc. of Arleta, Calif. The flavor which is to be plated onto the synthetic amorphous silica must be in a liquid state.

In an actual reduction to practice a 30 cubic foot ribbon blender was used, having spray nozzles which were adjusted to spray the liquid flavor directly onto the synthetic amorphous silica while the synthetic amorphous silica is being blended. The chocolate and cherry flavors were each separately plated onto synthetic amorphous silica. In each instance 150 pounds of the liquid flavor was plated on 100 pounds of the synthetic amorphous silica. That is to say the resultant plated material may comprise by weight about 60–70% liquid flavor and about 30–40% synthetic amorphous silica, although these ratios may be varied depending upon the flavoring used and the desired taste of the consumer of the nutritional product.

All of the synthetic amorphous silica was loaded into the blender and was agitated while the liquid flavor was sprayed thereon at a rate of 1.3 gallons per minute at a pressure of 400 pounds per square inch. After all of the liquid flavor was added, the mixture was agitated for an additional twenty five minutes. The plated material was then discharged into a sifter equipped with a #10 U.S. Standard Mesh Screen and then collected in specified containers.

To manufacture the food bar, the sorbitol and cocoa are passed separately through a #16 mesh screen. The plated cherry and chocolate flavors are blended with about 12.5% of the oil until they are mixed thoroughly. The rest of the oil is then blended with the flavor mixture for about 1 minute. The whey protein concentrate and the polydextrose are then added to the oil mixture and blended for 1 minute. The glycerin and sorbitol are then blended into the oil mixture for about 1 minute. The cocoa, the aspartame, and the vitamin/mineral premix are then added to the oil mixture and blended for about 1 minute. The calcium caseinate is then added and blended for about 1 minute.

The corn syrup and citric acid are preblended and then added to the oil mixture. The sodium acid pyrophosphate is then added and the resultant mixture blended for 3 minutes. The potassium sorbate is dissolved in the water, and then the water is added to the mixture and blended for about 3 minutes. The resultant mixture is then preferably extruded and cut into bars weighing preferably 67 grams.

The potassium sorbate controls microbial growth. The citric acid serves as a flavor stabilizer, and preferably the granular form is used. Additionally, the sodium citrate is preferably used in granular form. The polydextrose, glycerol, sorbitol, and sodium acid pyrophosphate (SAPP) act as texture stabilizers. Preferably the cherry flavor is from Bush Boake Allen of Montvale, N.J., U.S.A. and the chocolate flavor is from Flavor Producers, of Arleta, Calif., U.S.A. with the percentages set forth above being the weight of the flavors when plated on synthetic amorphous silica. The SAPP is preferably food grade 28. Still further, the sorbitol is crystalline. The source of calcium caseinate is EXCEL-PRO. The whey protein concentrate is ALACEN 882 from New Zealand Milk Producers. The high fructose corn syrup is 90% fructose. The partially hydrogenated soybean oil is VAN DEN BERGH #321. The water may be tap water.

The invention will be better understood in view of the following examples, which are illustrative only and should not be construed as limiting the invention.

EXPERIMENTAL-DETERMINATION OF FOOD PRODUCT COMPOSITION

Example 1—Control

An initial problem was arriving at a formulation for a food product, and more specifically a food bar, which exhibited palatable texture. Given the many potential protein sources, the high moisture content, and the many potential carbohydrate sources, initial attempts involved formulations of the type as set forth below in Tables 2 through 5.

TABLE 2

| Ingredient | Concentration by weight |
|---|---|
| Calcium caseinate | 23.49 |
| Egg albumin | 24.27 |
| Dutch process cocoa powder, lecithinated | 5.01 |
| Partially hydrogenated soybean oil | 8.51 |
| 55% High fructose corn syrup | 15.70 |
| Glycerin | 7.83 |
| Chocolate flavoring | 0.16 |
| Cherry flavoring | 0.16 |
| Potassium sorbate | 0.20 |
| Aspartame | 0.16 |
| Water | 9.82 |
| Vitamin/Mineral Premix | 4.71 |

The chocolate flavoring was from Flavor Producers, and the cherry flavoring was from Bush Boake Allen. Both were added as they were obtained from their respective sources. The bar was too hard, and hence unacceptable.

TABLE 3

| Ingredient | Concentration by weight |
|---|---|
| Calcium caseinate | 25.28 |
| Egg albumin | 26.13 |
| Dutch process cocoa powder, lecithinated | 5.39 |
| High oleic sunflower oil | 6.07 |
| Solid fat (partially hydrogenated soy oil) | 3.03 |
| 55% High fructose corn syrup | 13.48 |
| Glycerin | 3.37 |
| Potassium sorbate | 0.22 |
| Aspartame | 0.17 |
| Water | 11.80 |
| Vitamin/Mineral Premix | 5.07 |

When a food bar was made having the formulation shown in Table 3, initially the texture was acceptable, but after only three hours the bar was too hard. Therefore this formulation was unacceptable.

TABLE 4

| Ingredient | Concentration by weight |
|---|---|
| Calcium caseinate | 23.79 |
| Lactalbumin | 23.79 |
| Dutch process cocoa powder, lecithinated | 5.08 |
| Partially hydrogenated soybean oil | 8.55 |
| 55% High fructose corn syrup | 14.08 |
| Glycerin | 8.07 |
| Flavorings | 1.69 |
| Potassium sorbate | 0.21 |
| Aspartame | 0.49 |
| Water | 6.97 |
| Citric acid | 1.60 |
| Vitamin/Mineral Premix | 5.68 |

The Lactalbumin was ALATAL 812 from New Zealand Milk Producers. When a food bar was made having the formulation shown in Table 4, the resultant mixture was crumbly and not formable into bars. Therefore this formulation was unacceptable.

TABLE 5

| Ingredient | Concentration by weight |
|---|---|
| Whey protein concentrate | 14.74 |
| Lactalbumin | 34.40 |
| Dutch process cocoa powder, lecithinated | 5.13 |
| Partially hydrogenated soybean oil | 8.64 |
| 55% High fructose corn syrup | 12.12 |
| Glycerin | 8.16 |
| Flavorings | 1.74 |
| Potassium sorbate | 0.21 |
| Aspartame | 0.49 |
| Water | 7.03 |
| Citric acid | 1.61 |
| Vitamin/Mineral Premix | 5.73 |

The whey protein concentrate was ALACEN 878 from New Zealand Milk Producers, and the Lactalbumin was ALATAL 812 from New Zealand Milk Producers. When a food bar was made having the formulation shown in Table 5, the resultant mixture was sandy and gritty. Therefore this formulation was unacceptable.

Example 2—Control

Eventually, formulations were made which exhibited acceptable palatable texture. A representative formulation is set forth above in Table 1 (except for an absence of the flavoring components). Thus, the problem with obtaining an initially acceptable flavor remained. For example, even where palatable texture was obtained, the choice of flavoring was critical. Some flavorings which were acceptable in theory, reacted initially with the food product composition and created an immediate taste which was unacceptable. Such flavorings were ruled unacceptable for use with the specific composition of the product of the invention.

In connection with the formulation set forth in Table 1, a raspberry flavoring (Seely Raspberry SY-328) was tried. Unexpectedly its use in this particular food matrix resulted in a food product which exhibited a an unacceptable taste.

Another proposed flavoring system which was thought acceptable in theory was a chocolate flavoring (David Michael Chocolate 12648). When tried in this particular food matrix, its use unexpectedly resulted in an unacceptable taste sensation.

Still another proposed flavoring system which was thought acceptable in theory was another chocolate flavoring (David Michael Chocolate 10383). When tried in this particular food matrix its use also unexpectedly resulted in an unacceptable taste sensation.

Still another proposed flavoring system which was thought acceptable in theory was a cherry flavoring (McCormick Cherry 3DB136). When tried in this particular food matrix its use unexpectedly resulted in an unacceptable taste.

Still another proposed flavoring system which was thought acceptable in theory was another cherry flavoring (McCormick Cherry A2-845-01). When tried, in this particular food matrix, its use unexpectedly resulted in an unacceptable taste.

Example 3—Control

Eventually, a choice of flavoring was found which produced an initially acceptable taste, plus the food product exhibited acceptable texture. However, over a relatively short period of time, comparable to the expected shelf life of the product, the flavor either disappeared or became objectionable.

Once again the formulation set forth above in Table 1, but for the flavor system utilized therein, was used. Initially the flavor and texture were fine, but after as little as one week an unacceptable change in flavor was detectable.

For example, a chocolate pecan toffee flavor system was used, with this choice of system incorporating a butter pecan flavoring, a toffee flavoring, and cocoa. While initially it tasted like chocolate pecan toffee, after one week the flavor resembled black licorice, with no chocolate taste perceptible at all.

In the way of another example, a chocolate caramel peanut system was tried, incorporating cocoa, a peanut flavor (Ungerer Peanut), and a caramel flavor (Haarman & Reimer H 5411/261617). While initially the taste was acceptable, after one week the flavor exhibited an acetone taste.

It was evident that a problem existed in being able to preserve flavors in this type of food product. It is well known that flavors react with proteins, and react even more so with aspartame. Attempts have been made to protect the flavor of a food product. For example, the flavoring has been plated or spray dried onto carriers such as sugars, starches, maltodextrin or gums. Alternatively, flavorings have been incorporated inside of a sugar glass. Another approach has been to add the flavoring at the end of the production process in an attempt to minimize the time associated with any potential adverse reaction. Still, the above carriers tend to react with water, such that the physical protection breaks down. This was found to be true even if the flavoring was first added by itself to an oil phase: the flavoring soon lost its flavor.

Example 4—Control

The formulation disclosed above in Table 1, but for the flavor system utilized therein, was used. In fact, the flavor system used the flavorings disclosed in Table 1 but they were used with the carriers supplied by their respective sources, which in the case of the preferred chocolate and cherry flavorings listed in Table 1 were water soluble carriers. After six weeks a significant loss in flavor was detectable, which was unacceptable.

Example 5—Control

The formulation disclosed above in Table 1, but for the flavor system utilized therein, was used. In fact, the flavor system used the flavorings disclosed in Table 1 but they were used with oil soluble carriers after having their flavor extracted made without the original water soluble carriers. Benzyl alcohol was chosen for use as the carrier for both flavors. The flavorings were added to the oil phase. After six weeks the food product when tasted exhibited a sensory effect best described as being "tongue numbing", which was unacceptable.

Example 6—Control

The formulation disclosed above in Table 1, but for the flavor system utilized therein, was used. In fact, the flavor system used the flavorings disclosed in Table 1 but they were used with oil soluble carriers after having their flavor made without from the original water soluble carriers. Benzyl alcohol was chosen for use as the carrier for the chocolate flavor, while triacetin was chosen as the carrier for the cherry flavor. Once again, the flavorings were added to the oil phase. After six weeks the food product when tasted exhibited a sensory effect best described as being "tongue numbing". Additionally, and unexpectedly, the food product exhibited a chemical or medicinal taste, which was unacceptable.

Example 7—Control

The formulation disclosed above in Table 1, but for the flavor system utilized therein, was used. In fact, the flavor system used the flavorings disclosed in Table 1 but they had their flavor made without from the original water soluble carriers and plated onto synthetic amorphous silica. The plated silica was added to the water phase. After six weeks the food product when tasted exhibited a significant loss in flavor which was unacceptable.

Example 8—Invention

When the food product composition was modified to the formulation set forth above in the discussion of best mode, it resulted in a food product which was of a palatable texture and which had flavor stability. The formulation disclosed above in Table 1 was used. Unlike the formulation in Example 7, the plated synthetic amorphous silica was added to the oil phase. After six weeks the food product when tasted exhibited a good, chocolate cherry flavor. In fact the method of preserving the flavor resulted in a food product having a stable flavor for months. This was acceptable.

The unique composition of the food product of this invention also may be better appreciated by comparing its composition with a typical chocolate candy bar. Some corresponding values for typical candy bars are 20% fat, 10% protein, and 60% carbohydrates by weight, with the balance being mostly moisture and ash. Meanwhile, the food bar made in accordance with the preferred embodiment of this invention is about 9% fat, 37% protein, and 25% carbohydrates, with the percentage of carbohydrates referring to available carbohydrates. The distinction between available and total carbohydrates concerns the fact that total carbohydrates include some less digestible components (i.e., fiber and polydextrose).

Industrial Applicability

The food product industry has long sought to provide an improved method for preserving flavor in foods containing aspartame, as well as foods relatively high in protein. This would have significant implications in very low calorie diets. The product of this invention, and its method of manufacture, satisfies those long felt needs.

The food bar produced as a result of this invention is palatable and flavor-stable over several months at least. The shelf life is anticipated at being greater than six months. Additionally, the good tasting food bar contains the recommended daily allowances of numerous vitamins and minerals (including trace minerals). Furthermore, the initial levels of the vitamins counter vitamin degradation.

While the food product and the method for preserving the flavor associated with the food product herein described constitute preferred embodiments of the invention, it is to be understood that the invention is not limited to the precise formulation or method and that changes may be made therein without departing from the scope of the invention which is defined in the appended claims.

What is claimed is:

1. A method for producing a food product having enhanced flavor stability said food product containing an oil-based flavoring and aspartame, said food product additionally comprising a combination of ingredients selected from the group consisting of proteins, solid fat, liquid oil, carbohydrates, vitamins, minerals and water, said method comprising the steps of
    (a) adding said oil-based flavoring to synthetic amorphous silica to form flavored silica;
    (b) combining said flavored silica with the food product liquid oil to yield an oil dispersion containing flavored silica;
    (c) mixing together said protein, fat, vitamins, minerals, carbohydrates, water and aspartame with said oil dispersion to form a mixture; and
    (d) forming said mixture into said food product.

2. The method according to claim 1 wherein said vitamins and minerals comprise at least 4.5 % by weight of said food bar.

3. The method according to claim 1 wherein said proteinaceous material comprises at least 37% by weight of said food bar, and said carbohydrate material comprises about 25% by weight of said food bar.

4. The method according to claim 1 wherein said proteinaceous material comprises between 37% and 43% by weight of said food bar, said carbohydrate material comprises about 25% by weight of said food bar, and said fat comprises between 9% and 10.7% by weight of said food bar.

5. A method for producing a food bar having enhanced flavor stability said food bar containing an oil-based flavoring and aspartame, said food bar additionally comprising a combination of ingredients selected from the group consisting of proteins, solid fat, liquid oil, carbohydrates, vitamins, minerals and water, said method comprising the steps of
    (a) adding said oil-based flavoring to synthetic amorphous silica to form flavored silica;
    (b) combining said flavored silica with the food product liquid oil to yield an oil dispersion containing flavored silica;
    (c) mixing together said protein, fat, vitamins, minerals, carbohydrates, water and aspartame with said oil dispersion to form a mixture; and
    (d) forming said mixture into said food bar.

6. The method according to claim 5 wherein said vitamins and minerals comprise at least 4.5 % by weight of said food bar.

7. The method according to claim 5 wherein said proteinaceous material comprises at least 37% by weight of said food bar, and said carbohydrate material comprises about 25% by weight of said food bar.

8. The method according to claim 5 wherein said proteinaceous material comprises between 37% and 43% by weight of said food bar, said carbohydrate material comprises about 25% by weight of said food bar, and said fat comprises between 9% and 10.7% by weight of said food bar.

* * * * *